United States Patent
Sotome et al.

(10) Patent No.: US 12,034,142 B2
(45) Date of Patent: Jul. 9, 2024

(54) METHOD OF PRODUCING NEGATIVE ELECTRODE PLATE FOR NON-AQUEOUS ELECTROLYTE SECONDARY BATTERY

(71) Applicant: PRIME PLANET ENERGY & SOLUTIONS, INC., Tokyo (JP)

(72) Inventors: Kazuhiro Sotome, Himeji (JP); Kaori Ishikawa, Nishinomiya (JP); Yuta Matsuo, Kobe (JP); Kentaro Takahashi, Kasai (JP); Daisuke Ikeda, Kakogawa (JP); Kunihiko Hayashi, Miki (JP); Naoki Uchida, Kakogawa (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 120 days.

(21) Appl. No.: 17/501,092

(22) Filed: Oct. 14, 2021

(65) Prior Publication Data
US 2022/0140310 A1 May 5, 2022

(30) Foreign Application Priority Data
Nov. 5, 2020 (JP) .................................. 2020-184992

(51) Int. Cl.
*H01M 4/04* (2006.01)
*H01M 4/02* (2006.01)
(Continued)

(52) U.S. Cl.
CPC ......... *H01M 4/0435* (2013.01); *H01M 4/366* (2013.01); *H01M 4/583* (2013.01);
(Continued)

(58) Field of Classification Search
CPC .... H01M 4/0435; H01M 4/366; H01M 4/583; H01M 4/622; H01M 2004/021; H01M 2004/027
See application file for complete search history.

(56) References Cited

U.S. PATENT DOCUMENTS

2020/0075958 A1 3/2020 Uchida et al.
2021/0020906 A1* 1/2021 Yamazaki ............. H01M 4/133
(Continued)

FOREIGN PATENT DOCUMENTS

CN 103633293 A 3/2014
CN 104521038 A 4/2015
(Continued)

*Primary Examiner* — Brian R Ohara
*Assistant Examiner* — Emily Elizabeth Freeman
(74) *Attorney, Agent, or Firm* — Finnegan, Henderson, Farabow, Garrett & Dunner, LLP

(57) ABSTRACT

(A) A first layer is formed by applying a first negative electrode slurry to the surface of a negative electrode substrate. (B) A second layer is formed by applying a second negative electrode slurry to the surface of the first layer. The first negative electrode slurry includes a first negative electrode composite material. The second negative electrode slurry includes a second negative electrode composite material. Each of the first negative electrode composite material and the second negative electrode composite material includes a negative electrode active material and a cellulose-based binder. The negative electrode active material includes a first graphite powder and a second graphite powder. The first negative electrode composite material includes the cellulose-based binder at a first mass fraction. The second negative electrode composite material includes the cellulose-based binder at a second mass fraction.

4 Claims, 2 Drawing Sheets

(51) Int. Cl.
*H01M 4/36* (2006.01)
*H01M 4/583* (2010.01)
*H01M 4/62* (2006.01)

(52) U.S. Cl.
CPC ...... *H01M 4/622* (2013.01); *H01M 2004/021* (2013.01); *H01M 2004/027* (2013.01)

(56) References Cited

U.S. PATENT DOCUMENTS

| | | | | |
|---|---|---|---|---|
| 2022/0045327 A1* | 2/2022 | Hwang | ............. | H01M 10/0525 |
| 2022/0115703 A1* | 4/2022 | Miyachi | ............ | H01M 10/0567 |

FOREIGN PATENT DOCUMENTS

| | | |
|---|---|---|
| CN | 110875492 A | 3/2020 |
| CN | 111492515 A | 8/2020 |
| JP | 2004-127913 A | 4/2004 |
| JP | 2015-138644 A | 7/2015 |
| JP | 2017-062911 A | 3/2017 |
| JP | 2020-035682 A | 3/2020 |
| WO | WO 2014/024473 A1 | 2/2014 |
| WO | WO 2020/158153 A1 | 8/2020 |

* cited by examiner

METHOD OF PRODUCING NEGATIVE ELECTRODE PLATE FOR NON-AQUEOUS ELECTROLYTE SECONDARY BATTERY

This non-provisional application is based on Japanese Patent Application No. 2020-184992 filed on Nov. 5, 2020 with the Japan Patent Office, the entire contents of which are hereby incorporated by reference.

BACKGROUND OF THE INVENTION

Field of the Invention

The present disclosure relates to a method of producing a negative electrode plate for a non-aqueous electrolyte secondary battery.

Description of the Background Art

WO2014/024473 discloses a mixed graphite material containing graphite made of artificial graphite and graphite obtained by processing natural graphite into spherical lumps.

SUMMARY OF THE INVENTION

Hereinafter, in the present specification, a "negative electrode plate for a non-aqueous electrolyte secondary battery" may be abbreviated as a "negative electrode plate", and a "non-aqueous electrolyte secondary battery" may be abbreviated as a "battery".

In order to increase the energy density of a battery, it is required to use a high-density negative electrode plate. However, it is difficult to ensure the amount of voids in a high-density negative electrode plate. If the amount of voids in the negative electrode plate is smaller, the reaction area becomes smaller, which may lower the output characteristics.

The negative electrode plate contains graphite powder (accumulation of graphite particles) as a negative electrode active material. For example, spherical graphite particles (hereinafter will be referred to as "spherical particles") may be used as the negative electrode active material. Voids are likely to be formed between the spherical particles. Therefore, even in a high-density negative electrode plate, it is expected to ensure a desired amount of voids.

However, graphite particles are generally soft and may be easily crushed. When the negative electrode plate is compressed, the spherical particles in the surface layer of the negative electrode plate are crushed, which locally reduces the amount of voids. As a result, the distribution of voids varies in the thickness direction of the negative electrode plate. The variation in the distribution of voids may reduce the cycle capacity retention rate.

An object of the present disclosure is to improve the cycle capacity retention rate.

Hereinafter, the technical configuration and effects of the present disclosure will be described. However, the mechanism of action described in the present disclosure includes a presumption. Whether the mechanism of action is correct or not should not limit the scope of the claims.

[1] A method of producing a negative electrode plate for a non-aqueous electrolyte secondary battery includes the following steps of (A) to (C):
  (A) applying a first negative electrode slurry to a surface of a negative electrode substrate to form a first layer;
  (B) applying a second negative electrode slurry to a surface of the first layer to form a second layer; and
  (C) compressing the first layer and the second layer to produce the negative electrode plate.

The first negative electrode slurry includes a first negative electrode composite material. The second negative electrode slurry includes a second negative electrode composite material. Each of the first negative electrode composite material and the second negative electrode composite material includes a negative electrode active material and a cellulose-based binder.

The negative electrode active material includes a first graphite powder and a second graphite powder. The first graphite powder has a circularity of 0.94 or more. A fraction of a D50 of the second graphite powder to a D50 of the first graphite powder is 29% to 54%. In each of the first negative electrode composite material and the second negative electrode composite material, the first graphite powder has a mass fraction of 88.1% to 93.6%, and the second graphite powder has a mass fraction of 5% to 10%.

The first negative electrode composite material includes the cellulose-based binder at a first mass fraction. The second negative electrode composite material includes the cellulose-based binder at a second mass fraction. A ratio of the first mass fraction to the second mass fraction is 0.40 to 0.56.

In the present disclosure, highly spherical graphite particles (hereinafter will be referred to as "highly spherical particles") are used. In other words, the first graphite powder has a circularity of 0.94 or more. It is expected that the highly spherical particles may increase the amount of voids. However, the highly spherical particles in the surface layer of the negative electrode plate may be crushed, which may locally reduce the amount of voids.

In the present disclosure, the cellulose-based binder may alleviate the crush of highly spherical particles. In other words, the mass fraction of the cellulose-based binder in the second layer (the upper layer) is set higher than that in the first layer (the lower layer). The cellulose-based binder in the upper layer may function as a buffer material during compression so as to alleviate the crush of highly spherical particles. As a result, it is expected to reduce the variation in the distribution of voids in the thickness direction of the negative electrode plate.

The ratio of the first mass fraction to the second mass fraction is 0.40 to 0.56. The first mass fraction indicates the mass fraction of the cellulose-based binder in the first layer (the lower layer). The second mass fraction indicates the mass fraction of the cellulose-based binder in the second layer (the upper layer). If the ratio of the first mass fraction to the second mass fraction is greater than 0.56, the variation in the distribution of voids tends to increase. If the ratio of the first mass fraction to the second mass fraction is less than 0.40, the dispersion stability of the first negative electrode slurry may decrease excessively, and the peel strength of the first layer may decrease excessively.

As described above, voids are likely to be formed between the highly spherical particles. On the other hand, the contact between the highly spherical particles is small. The highly spherical particles may expand and contract in the charge/discharge cycle. Due to the volume changes in the highly spherical particles, the contact between the highly spherical particles may be lost in the charge/discharge cycle. If the contact between the highly spherical particles is lost, the electron conduction path may become disconnected. As a result, the cycle capacity retention rate may decrease.

In the present disclosure, in addition to the first graphite powder (highly spherical particles), a second graphite powder (small particles) is used. The small particles may enter the gap between the highly spherical particles to form an electron conduction path. The electron conduction path may be formed by any conductive material (such as carbon black). The conductive material has substantially no capacitance. Therefore, the addition of the conductive material may decrease the energy density.

The fraction of the D50 of the second graphite powder to the D50 of the first graphite powder is 29% to 54%. Hereinafter, the fraction may be referred to as "D50 fraction". If the D50 fraction is greater than 54%, the cycle capacity retention rate tends to decrease. The reason therefor may be that it is difficult for the small particles to enter the gap between the highly spherical particles, and thereby, a desired electron conduction path is not formed.

Further, in each of the first negative electrode composite material and the second negative electrode composite material, the second graphite powder has a mass fraction of 5% to 10%. If the mass fraction of the second graphite powder is less than 5%, the cycle capacity retention rate tends to decrease. The reason therefor may be that the electron conduction path is insufficient. If the mass fraction of the second graphite powder is greater than 10%, the cycle capacity retention rate also tends to decrease. The reason therefor may be that the amount of voids is insufficient.

Due to the synergic effects as mentioned above, the present disclosure is expected to improve the cycle capacity retention rate.

[2] The first graphite powder may have a D50 of, for example, 13 μm to 19 μm.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
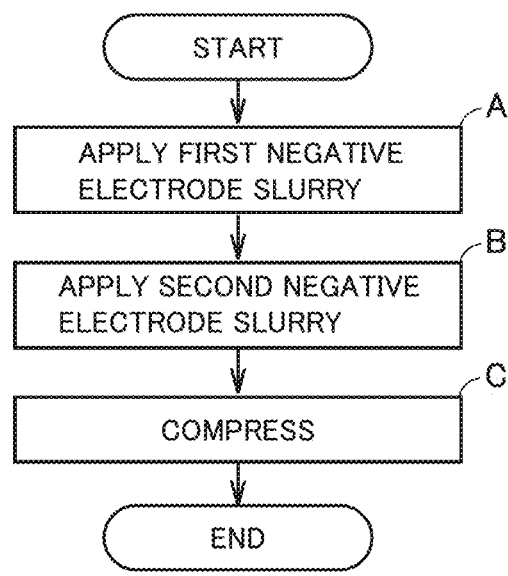
FIG. 1 is a flowchart schematically illustrating a method of producing a negative electrode plate according to an embodiment of the present disclosure.

Hereinafter, an embodiment of the present disclosure (also referred to as "the present embodiment" in the present specification) will be described. It should be noted that the following description is not intended to limit the scope of claims.

In the present specification, the expressions such as "comprise", "include", "have", and the conjugations thereof (such as "be composed of", "encompass", and "contain") are open-ended expressions. In other words, each of these expressions includes a certain configuration but is not limited to such configuration. The expression "consist of" is a closed expression. The expression "consist essentially of" is a semi-closed expression. In other words, the expression "consisting essentially of" indicates an additional component may also be included in addition to the essential component or components unless an object of the present technique is impaired. For example, a component that is usually expected to be included in the relevant field to which the present technique pertains (such as an inevitable impurity, for example) may be included as the additional component.

In the present specification, two or more steps, actions and operations included in a method are not limited to the described order unless otherwise specified.

In the present specification, a numerical range such as "29% to 54%" includes both the upper limit and the lower limit unless otherwise specified. For example, "29% to 54%" indicates a numerical range of "29% or more and 54% or less". Moreover, any numerical value arbitrarily selected from the numerical range may be set as a new upper limit and/or a new lower limit. For example, any numerical value within the numerical range and any numerical value described in another location of the present specification may be combined to define a new numerical range.

In the present specification, when a compound is represented by a stoichiometric composition formula such as "$LiCoO_2$", the stoichiometric composition formula is merely a representative example. The compositional ratio may be non-stoichiometric. For example, when lithium cobalt oxide is represented as "$LiCoO_2$", the lithium cobalt oxide is not limited to the composition ratio of "Li/Co/O=1/1/2", and may include Li, Co, and O in any composition ratio unless otherwise specified.

The dimensional relationship in each figure may not be necessarily identical to the actual dimensional relationship. The dimensional relationship (in length, width, thickness, and the like) in each figure may have been changed for the purpose of assisting the understanding of the present disclosure. Further, a certain configuration may be partially omitted.

(Method of Producing Negative Electrode Plate)

The negative electrode plate in the present embodiment is a negative electrode plate for a non-aqueous electrolyte secondary battery. The non-aqueous electrolyte secondary battery may be used in any application. For example, the non-aqueous electrolyte secondary battery may be used as a main power source or an assisting power source in an electric vehicle. A plurality of non-aqueous electrolyte secondary batteries (unit batteries) may be connected to form a battery module or a battery assembly.

FIG. 1 is a flowchart schematically illustrating a method of producing a negative electrode plate according to an embodiment of the present disclosure.

The method of producing a negative electrode plate according to the present embodiment includes "(A) applying a first negative electrode slurry", "(B) applying a second negative electrode slurry", and "(C) compressing".

Hereinafter, the "first negative electrode slurry" and the "second negative electrode slurry" may be collectively referred to as the "negative electrode slurry". The "first negative electrode composite material" and the "second negative electrode composite material" may be collectively referred to as the "negative electrode composite material".

(((A) Applying a First Negative Electrode Slurry and (B) Applying a Second Negative Electrode Slurry))

The method of producing a negative electrode plate according to the present embodiment includes applying a first negative electrode slurry to a surface of a negative electrode substrate to form a first layer. Further, the method of producing a negative electrode plate according to the present embodiment includes applying a second negative electrode slurry to a surface of the first layer to form a second layer.

The first layer and the second layer together constitute a negative electrode active material layer. The negative electrode active material layer may be formed on only one surface of the negative electrode substrate, or may be formed on both the front surface and the back surface of the negative electrode substrate. As long as the negative electrode active material layer includes the first layer and the second layer, the negative electrode active material layer may further include another layer. The mass ratio of the first layer to the second layer, for example, may be "the first layer/the second layer=1/9" to "the first layer/the second layer=9/1", or may be "the first layer/the second layer=3/7" to "the first layer/the second layer=7/3".

The negative electrode slurry includes a negative electrode composite material and a dispersion medium. The dispersion medium may be, for example, a material having affinity to a cellulose-based binder. The dispersion medium may include water (ion exchanged water) or the like, for example. The dispersion medium may consist essentially of water, for example. In addition to water, the dispersion medium may further include alcohol, ketone, ether or the like, for example.

After the negative electrode composite material is prepared in advance, the negative electrode composite material may be dispersed in the dispersion medium. The negative electrode composite material may be prepared by mixing materials in the dispersion medium. In the present embodiment, any stirring apparatus, any mixing apparatus, any dispersing apparatus or the like may be used. For example, the negative electrode composite material may be prepared by mixing a negative electrode active material and a binder at a predetermined formulation in a stirring tank of a stirring apparatus. Next, the dispersion medium is inputted into the stirring tank, and the mixture is stirred. Thus, a negative electrode slurry is prepared. The stirring conditions (for example, the stirring time, the stirring speed and the like) may be appropriately adjusted. The order of inputting the materials is arbitrary. The materials may be inputted simultaneously, or may be inputted sequentially. The amount of the dispersion medium to be used is arbitrary. The amount of the dispersion medium to be used may be appropriately adjusted in accordance with a coating apparatus or the like.

The negative electrode substrate is a conductive sheet. The negative electrode substrate may be, for example, a copper (Cu) foil. The negative electrode substrate may have a thickness of, for example, 5 μm to 50 μm. The surface of the negative electrode substrate may be formed with a coating layer, for example. The coating layer may contain, for example, carbon black.

In the present embodiment, any coating apparatus may be used. For example, a slot die coater, a roll coater or the like may be used. The coating apparatus may be capable of coating multiple layers simultaneously. The first negative electrode slurry and the second negative electrode slurry may be sequentially coated or may be substantially simultaneously coated.

In the present embodiment, any drying apparatus may be used. For example, a hot air dryer, an infrared dryer or the like may be used. The second negative electrode slurry may be coated after the first negative electrode slurry is dried. Alternatively, the second negative electrode slurry may be coated before the first negative electrode slurry is dried.

(Negative Electrode Composite Material)

The negative electrode composite material includes a negative electrode active material and a cellulose-based binder. The negative electrode composite material may be substantially composed of a negative electrode active material and a cellulose-based binder. For example, the negative electrode composite material may further include a conductive material. The conductive material may include any component. For example, the conductive material may include at least one selected from the group consisting of carbon black, carbon nanotubes, and graphene flakes. The conductive material may have a mass fraction of, for example, 0% to 10% with respect to the negative electrode composite material. In addition to the cellulose-based binder, the negative electrode composite material may further include, for example, another binder (which will be described later).

(Negative Electrode Active Material)

The negative electrode active material may have a mass fraction of, for example, 90% to 99% with respect to the negative electrode composite material. The negative electrode active material occludes and releases lithium ions by electrochemical reaction. The negative electrode active material of the present embodiment includes a first graphite powder and a second graphite powder. The first graphite powder is an accumulation of highly spherical particles. It is considered that the first graphite powder may contribute to the formation of voids in the negative electrode active material layer. The second graphite powder is an accumulation of small particles. It is considered that the second graphite powder may contribute to the formation of an electron conduction path between the highly spherical particles.

(Mass Fraction of First Graphite Powder)

In each of the first negative electrode composite material and the second negative electrode composite material, the first graphite powder has a mass fraction of 88.1% to 93.6%. In the first negative electrode composite material, the first graphite powder may have a mass fraction of, for example, 88.5% to 93.6%. In the second negative electrode composite material, the first graphite powder may have a mass fraction of, for example, 88.1% to 93.1%.

(Mass Fraction of Second Graphite Powder)

In each of the first negative electrode composite material and the second negative electrode composite material, the second graphite powder has a mass fraction of 5% to 10%. If the mass fraction of the second graphite powder is less than 5%, the cycle capacity retention rate tends to decrease. The reason therefor may be that the electron conduction path is insufficient. If the mass fraction of the second graphite powder is greater than 10%, the cycle capacity retention rate also tends to decrease. The reason therefor may be that the amount of voids is insufficient.

(Particle Size Distribution)

The particle size distribution in the present embodiment is volume-based particle size distribution. In the particle size distribution, a particle size at which the cumulative particle volume accumulated from the side of small sizes reaches 10% of the total particle volume is defined as "D10", a particle size at which the cumulative particle volume accumulated from the side of small sizes reaches 50% of the total particle volume is defined as "D50", and a particle size at which the cumulative particle volume accumulated from the side of small sizes reaches 90% of the total particle volume is defined as "D90". In the present embodiment, each of D10, D50 and D90 is significant to the integer part, and the decimal part is rounded to the integer part.

The particle size distribution is measured by using a laser-diffraction particle size distribution analyzer. A suspension is prepared by dispersing a sample powder and a dispersant in a dispersion medium (such as ion exchanged water). The dispersant may be, for example, "TRITON (registered trademark) X-100" or the like. The particle size distribution is measured by introducing the suspension into the particle size distribution analyzer.

(D50 of First Graphite Powder)

The first graphite powder may have a D50 of, for example, 13 μm to 19 μm. The first graphite powder may have a D50 of, for example, 13 μm to 17 μm. The first graphite powder may have a D50 of, for example, 17 μm to 19 μm.

(D50 of Second Graphite Powder)

The second graphite powder may have a D50 of, for example, 5 μm to 9 μm. The second graphite powder may have a D50 of, for example, 5 μm to 7 μm. The second graphite powder may have a D50 of, for example, 7 μm to 9 μm.

(D50 Fraction)

In the present embodiment, the fraction (D50 fraction) of the D50 of the second graphite powder to the D50 of the first graphite powder is 29% to 54% If the D50 fraction is greater than 54%, the cycle capacity retention rate tends to decrease. The reason therefor may be that it is difficult for the small particles to enter the gap between the highly spherical particles, and thereby, a desired electron conduction path is not formed. For example, the D50 fraction may be 53% or less, or may be 41% or less. For example, the D50 fraction may be 37% or more, or may be 41% or more. The D50 fraction is a percentage value obtained by dividing the D50 of the second graphite powder by the D50 of the first graphite powder. The D50 fraction is significant to the integer part, and the decimal part is rounded to the integer part.

(Span Value)

The negative electrode active material (mixed powder of the first graphite powder and the second graphite powder), for example, may have a span value of 1.08 to 1.18, or may have a span value of 1.1 to 1.15. The "span value" is an index indicating the spread of the particle size distribution. The larger the span value is, the larger the spread of the particle size distribution is.

The span value is calculated by the following expression (1).

$$(\text{span value})=(D90-D10)/D50 \tag{1}$$

wherein
"D90" represents D90 of the negative electrode active material,
"D10" represents D10 of the negative electrode active material, and
"D50" represents D50 of the negative electrode active material.

(Circularity)

The first graphite powder (accumulation of highly spherical particles) has a circularity of 0.94 or more. The "circularity" in the present embodiment is measured by using a flow-type particle image analyzer. For example, a flow-type particle image analyzer such as a rapid suspension particle size/shape analyzer "Model: FPIA-3000" manufactured by Sysmex or an equivalent device may be used. A suspension containing the sample powder is prepared. The suspension is supplied to a flow cell. The suspension passing through the flow cell is imaged by a strobe and an optical microscope. The particle image of each particle included in the image is analyzed. The detection range is 0.25 μm to 100 μm.

The circularity of each particle is calculated by the following expression (2):

$$(\text{circularity})=L_0/L \tag{2}$$

wherein
"$L_0$" represents the circumferential length of a circle having the same area as the particle image, and
"L" represents the circumferential length of the particle image.

In the present embodiment, an arithmetic mean of 100 or more particles is regarded as the circularity of the sample powder. The circularity is ideally 1. The first graphite powder may have a circularity of 0.94 to 1, for example.

The second graphite powder (small particles) may have any shape. The small particles may have the shape of spheres, the shape of lumps, or the shape of flakes, for example. The second graphite powder may have a circularity of less than 0.94, for example. The second graphite powder may have a circularity of 0.85 to 0.90, for example.

(Tap Density)

The negative electrode active material (mixed powder of the first graphite powder and the second graphite powder) may have a tap density of 0.9 g/cm$^3$ to 1.2 g/cm$^3$, for example. The negative electrode active material may have a tap density of 1.0 g/cm$^3$ to 1.1 g/cm$^3$, for example.

The tap density in the present embodiment is measured according to the following procedure. 50 g of the sample powder is gently filled in a measuring cylinder. The measuring cylinder is tapped for 1000 times. After being tapped for 1000 times, the apparent volume of the sample powder is measured from the scales on the measuring cylinder. The tap density is calculated by dividing the mass (50 g) of the sample powder by the apparent volume. The tap density is measured for three times or more. An arithmetic mean of the tap densities measured for three times or more is regarded as the tap density of the sample powder.

(Cellulose-Based Binder)

The negative electrode composite material includes a cellulose-based binder. In the present embodiment, the mass fraction of the cellulose-based binder in the first negative electrode composite material is different from that in the second negative electrode composite material. In other words, the first negative electrode composite material includes the cellulose-based binder at a first mass fraction. The second negative electrode composite material includes the cellulose-based binder at a second mass fraction. If the ratio of the first mass fraction to the second mass fraction is smaller, it indicates that the cellulose-based binder is relatively abundant in the second layer (the upper layer). It is expected that the cellulose-based binder may function as a buffer material when the negative electrode active material layer is being compressed. When the upper layer includes the cellulose-based binder at a larger amount, it is expected that the crush of highly spherical particles in the upper layer may be alleviated. In the present embodiment, the ratio of the first mass fraction to the second mass fraction is 0.40 to 0.56. If the ratio of the first mass fraction to the second mass fraction is greater than 0.56, the variation in the distribution of voids tends to increase. If the ratio of the first mass fraction to the second mass fraction is less than 0.40, the dispersion stability of the first negative electrode slurry may decrease excessively, and the peel strength of the first layer may also decrease excessively.

The first mass fraction may be, for example, 0.4% to 0.5%. The second mass fraction may be, for example, 0.9% to 1%. The ratio of the first mass fraction to the second mass fraction is significant to the second decimal number, and the decimal part after the third decimal place is rounded to the second decimal number.

The cellulose-based binder includes cellulose and a derivative thereof. For example, the cellulose-based binder may include at least one selected from the group consisting of carboxymethyl cellulose (CMC), hydroxyethyl cellulose, hydroxypropyl cellulose, hydroxyethyl methyl cellulose, and hydroxypropyl methyl cellulose. For example, the cellulose-based binder may be essentially composed of CMC.

The cellulose-based binder may be an acid binder or a salt binder. For example, CMC may be an acid CMC (CMC-H). For example, CMC may be a sodium salt CMC (CMC-Na), a lithium salt CMC (CMC-Li), an ammonium salt CMC (CMC-NH$_4$), or the like. A salt binder tends to have a high affinity to water.

The cellulose-based binder may have a mass average molecular weight of, for example, 100,000 to 1 million. The mass average molecular weight is measured according to a gel permeation chromatography (GPC) method. The mass average molecular weight of the cellulose-based binder is determined from the calibration curve of a standard sample and the elution time of the cellulose-based binder. The standard sample may be Pullulan. The weight average molecular weight is measured for three times or more. An arithmetic mean of the weight average molecular weights for three times or more is regarded as the mass average molecular weight of the cellulose-based binder.

(Other Binders)

The negative electrode composite material may further include other binders in addition to the cellulose-based binder. The negative electrode composite material may further include, for example, styrene-butadiene rubber (SBR). Thus, for example, the first negative electrode composite material may be substantially composed of 88.5% to 93.6% of the first graphite powder, 5% to 10% of the second graphite powder, 0.4% to 0.5% of the cellulose-based binder, and the remainder of SBR in mass fraction. For example, the second negative electrode composite material may be substantially composed of 88.1% to 93.1% of the first graphite powder, 5% to 10% by mass of the second graphite powder, 0.9% to 1% by mass of the cellulose-based binder, and the remainder of SBR in mass fraction.

(((C) Compressing))

The method of producing a negative electrode plate according to the present embodiment includes compressing the first layer and the second layer (i.e., the negative electrode active material layer) to produce a negative electrode plate. In the present embodiment, any compression apparatus may be used. For example, a rolling machine (roller) or the like may be used. The negative electrode active material layer is compressed to achieve the negative electrode plate. The negative electrode active material layer after compression may have a thickness of, for example, 10 μm to 200 μm. The negative electrode active material layer after compression may have a density of, for example, 0.8 g/cm$^3$ to 1.6 g/cm$^3$.

The negative electrode plate may be cut into a predetermined planar shape according to the specifications of a battery. For example, the negative electrode plate may be cut into a planar strip shape. For example, the negative electrode plate may be cut into a planar rectangular shape.

EXAMPLE

An example of the present disclosure (hereinafter, it will be referred to as "the present example") will be described below. It should be noted the following description is not intended to limit the scope of claims.

(Preparation of Negative Electrode Plate)
((No. 1))
The following materials were prepared:
first graphite powder: graphite powder A (circularity=0.94, D50=17 μm)
second graphite powder: graphite powder B (D50=7 μm)
cellulose-based binder: CMC-Na (may be abbreviated as "CMC" hereinafter)
other binder: SBR
dispersion medium: water
negative electrode substrate: Cu foil A negative electrode active material was prepared by mixing the first graphite powder and the second graphite powder. The mixing ratio was "the first graphite powder/the second graphite powder=93.5/5 (mass ratio)". The negative electrode active material had a span value of 1.13 and a tap density of 1.03 g/cm$^3$. The negative electrode active material, CMC and SBR were mixed to prepare a first negative electrode composite material. The mixing ratio was "the negative electrode active material/CMC/SBR=98.5/0.5/1 (mass ratio)". The first negative electrode composite material was dispersed in the dispersion medium to prepare a first negative electrode slurry.

A negative electrode active material was prepared by mixing the first graphite powder and the second graphite powder. The mixing ratio was "the first graphite powder/the second graphite powder=93.1/5 (mass ratio)". The negative electrode active material, CMC and SBR were mixed to prepare a second negative electrode composite material. The mixing ratio was "the negative electrode active material/CMC/SBR=98.1/0.9/1 (mass ratio)". The second negative electrode composite material was dispersed in the dispersion medium to prepare a second negative electrode slurry.

The first negative electrode slurry was coated on surfaces (both the front surface and the back surface) of the negative electrode substrate and dried to form a first layer. The second negative electrode slurry was coated on the surface of the first layer and dried to form a second layer. The mass ratio of the first layer to the second layer was "the first layer/the second layer=5/5". Thus, a negative electrode active material layer including the first layer and the second layer was formed. The negative electrode active material layer was compressed by using a rolling machine. Thus, a negative electrode plate was produced. The negative electrode plate was cut into a predetermined planar shape.

(Preparation of Battery)
((Preparation of Positive Electrode Plate))
The following materials were prepared:
positive electrode active material: Li(NiCoMn)O$_2$
conductive material: acetylene black
binder: polyvinylidene fluoride
dispersion medium: N-methyl-2-pyrrolidone
positive electrode substrate: aluminum foil The positive electrode active material, the conductive material, and the binder were mixed to prepare a positive electrode composite material. The mixing ratio was "the positive electrode active material/the conductive material/the binder=97.5/1/1.5 (mass ratio)". The positive electrode composite material was dispersed in the dispersion medium to prepare a positive electrode slurry. The positive electrode slurry was coated on the surfaces (both the front surface and the back surface) of the positive electrode substrate and dried to form a positive electrode active material layer. The positive electrode active material layer was compressed by using a rolling machine. Thus, a positive electrode plate was produced. The positive electrode plate was cut into a predetermined planar shape.

((Assembling))

Figure 2:
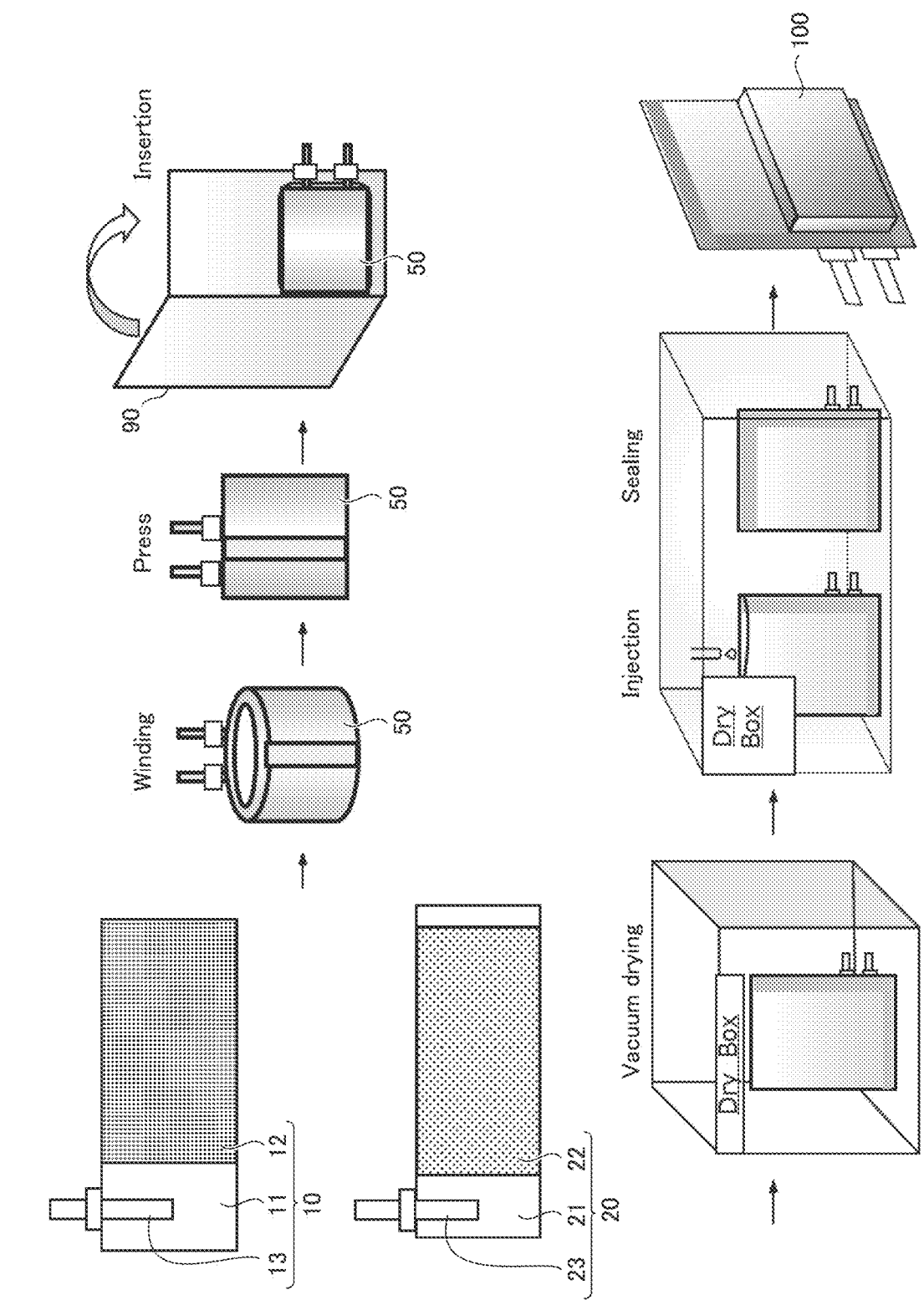
FIG. 2 is a diagram illustrating a flow of producing a test battery according to an example of the present disclosure.

FIG. 2 is a diagram illustrating a flow of producing a test battery according to the present example.

The positive electrode plate 10 had a planar strip shape. The positive electrode plate 10 included a positive electrode substrate 11 and a positive electrode active material layer 12. A positive electrode lead tab 13 was bonded to the positive electrode base material 11.

The negative electrode plate 20 had a planar strip shape. The negative electrode plate 20 included a negative electrode substrate 21 and a negative electrode active material layer 22. A negative electrode lead tab 23 was bonded to the negative electrode base material 21.

A separator (not shown) was prepared. The separator had a single layer structure. The separator was made of a porous polypropylene layer. The positive electrode plate 10, the separator and the negative electrode plate 20 were laminated in this order and spirally wound to form an electrode body 50. The positive electrode lead tab 13 and the negative electrode lead tab 23 were arranged on the outer periphery of the electrode body 50. After winding, the electrode body 50 was formed into a flat shape.

An exterior body 90 was prepared. The exterior body 90 was made of an aluminum laminate film. The electrode body 50 was inserted into the exterior body 90. After the insertion, the workpiece (the exterior body 90 and the electrode body 50) were placed in a dry box. The workpiece was vacuum dried. The drying temperature was 105° C. The drying time was 2.5 hours.

An electrolytic solution was prepared. The electrolytic solution was prepared from the following components:
solvent: "EC/EMC=3/7 (volume ratio)"
support electrolyte: $LiPF_6$ (concentration=1.0 mL/L)
additive: VC [amount of addition=2% (VC/solvent volume %)]
"EC" represents ethylene carbonate. "EMC" represents ethylmethyl carbonate. "VC" represents vinylene carbonate.

After vacuum drying, the electrolytic solution was injected into the exterior body 90. After the electrolytic solution was injected, the exterior body 90 was sealed. Thus, a test battery 100 (non-aqueous electrolyte secondary battery) was produced.

((No. 2))

A negative electrode plate and a test battery were produced in the same manner as in No. 1 except that graphite powder D (D50=5 μm) was used to replace graphite powder B (D50=7 μm).

((No. 3))

A negative electrode plate and a test battery were produced in the same manner as in No. 1 except that graphite powder E (D50=9 μm) was used to replace graphite powder B (D50=7 μm).

((No. 4))

A negative electrode plate and a test battery were produced in the same manner as in No. 1 except that the mixing ratio of the first negative electrode composite material was modified to "the first graphite powder/the second graphite powder/CMC/SBR=88.5/10/0.5/1 (mass ratio)", and the mixing ratio of the second negative electrode composite material was modified to "the first graphite powder/the second graphite powder/CMC/SBR=88.1/10/0.9/1 (mass ratio)".

((No. 5))

A negative electrode plate and a test battery were produced in the same manner as in No. 1 except that the mixing ratio of the first negative electrode composite material was modified to "the first graphite powder/the second graphite powder/CMC/SBR=93.6/5/0.4/1 (mass ratio)", and the mixing ratio of the second negative electrode composite material was modified to "the first graphite powder/the second graphite powder/CMC/SBR=93/5/1/1 (mass ratio)".

((No. 6))

A negative electrode plate and a test battery were produced in the same manner as in No. 1 except that graphite powder G (circularity=0.94, D50=19 μm) was used to replace graphite powder A (circularity=0.94, D50=17 μm).

((No. 7))

A negative electrode plate and a test battery were produced in the same manner as in No. 1 except that graphite powder H (circularity=0.94, D50=13 μm) was used to replace graphite powder A (circularity=0.94, D50=17 μm).

((No. 8))

A negative electrode plate and a test battery were produced in the same manner as in No. 1 except that graphite powder C (circularity=0.91, D50=17 μm) was used to replace graphite powder A (circularity=0.94, D50=17 μm).

((No. 9))

A negative electrode plate and a test battery were produced in the same manner as in No. 1 except that graphite powder F (D50=12 μm) was used to replace graphite powder B (D50=7 μm).

((No. 10))

A negative electrode plate and a test battery were produced in the same manner as in No. 1 except that the mixing ratio of the first negative electrode composite material was modified to "the first graphite powder/the second graphite powder/CMC/SBR=96/2.5/0.5/1 (mass ratio)", and the mixing ratio of the second negative electrode composite material was modified to "the first graphite powder/the second graphite powder/CMC/SBR=95.6/2.5/0.9/1 (mass ratio)".

((No. 11))

A negative electrode plate and a test battery were produced in the same manner as in No. 1 except that the mixing ratio of the first negative electrode composite material was modified to "the first graphite powder/the second graphite powder/CMC/SBR=86/12.5/0.5/1 (mass ratio)", and the mixing ratio of the second negative electrode composite material was modified to "the first graphite powder/the second graphite powder/CMC/SBR=85.6/12.5/0.9/1 (mass ratio)".

((No. 12))

A negative electrode plate and a test battery were produced in the same manner as in No. 1 except that the mixing ratio of the first negative electrode composite material was modified to "the first graphite powder/the second graphite powder/CMC/SBR=93.3/5/0.7/1 (mass ratio)", and the mixing ratio of the second negative electrode composite material was modified to "the first graphite powder/the second graphite powder/CMC/SBR=93.3/5/0.7/1 (mass ratio)".

(Cycle Test)

Each test battery was subjected to the charging/discharging cycle test at an environmental temperature of 25° C. for 500 cycles. One cycle represents one round of "CCCV charging to CC discharging" as described below. The capacity retention rate was calculated by dividing the discharge capacity at the 500th cycle by the discharge capacity at the first cycle.

CCCV charging: CC current=1/3 It, CV voltage=4.25 V, cut-off current=1/20 It
CC discharging: CC current=1/3 It, cut-off voltage=3.0 V
"CCCV (constant current, constant voltage)" represents a constant current-constant voltage mode. "CC (constant current)" represents a current at CC charging (or discharging)

mode. "CV (constant voltage)" represents a voltage at CV charging mode. The CV charging is completed when the current drops to the "cutoff current". The CC discharge is completed when the voltage reaches the "cutoff voltage". "It" is a symbol representing an electric current hour rate. With an electric current of 1 It, the design capacity of a test battery is discharged in one hour.

TABLE 1

| | First graphite powder (Gr1) | | Second graphite powder (Gr2) | D50 Fraction $D50_{(2)}/$ $D50_{(1)}$ | First negative electrode slurry First layer (lower layer) First negative electrode composite material (mass fraction) | | | | Second negative electrode slurry Second layer (upper layer) Second negative electrode composite material (mass fraction) | | | | CMC mass fraction ratio *3 $CMC_{(1)}/$ $CMC_{(2)}$ | Cycle test Capacity retention |
|---|---|---|---|---|---|---|---|---|---|---|---|---|---|---|
| No. | Circularity [—] | $D50_{(1)}$ [μm] | $D50_{(2)}$ [μm] | [%] | Gr1*1 [%] | Gr2*2 [%] | $CMC_{(1)}$ [%] | SBR [%] | Gr1 [%] | Gr2 [%] | $CMC_{(2)}$ [%] | SBR [%] | [—] | rate [%] |
| 1 | 0.94 | 17 | 7 | 41 | 93.5 | 5 | 0.5 | 1 | 93.1 | 5 | 0.9 | 1 | 0.56 | 92.9 |
| 2 | 0.94 | 17 | 5 | 29 | 93.5 | 5 | 0.5 | 1 | 93.1 | 5 | 0.9 | 1 | 0.56 | 93.1 |
| 3 | 0.94 | 17 | 9 | 53 | 93.5 | 5 | 0.5 | 1 | 93.1 | 5 | 0.9 | 1 | 0.56 | 93.0 |
| 4 | 0.94 | 17 | 7 | 41 | 88.5 | 10 | 0.5 | 1 | 88.1 | 10 | 0.9 | 1 | 0.56 | 94.4 |
| 5 | 0.94 | 17 | 7 | 41 | 93.6 | 5 | 0.4 | 1 | 93 | 5 | 1 | 1 | 0.40 | 93.4 |
| 6 | 0.94 | 19 | 7 | 37 | 93.5 | 5 | 0.5 | 1 | 93.1 | 5 | 0.9 | 1 | 0.56 | 93.0 |
| 7 | 0.94 | 13 | 7 | 54 | 93.5 | 5 | 0.5 | 1 | 93.1 | 5 | 0.9 | 1 | 0.56 | 92.6 |
| 8 | 0.91 | 17 | 7 | 41 | 93.5 | 5 | 0.5 | 1 | 93.1 | 5 | 0.9 | 1 | 0.56 | 89.9 |
| 9 | 0.94 | 17 | 12 | 71 | 93.5 | 5 | 0.5 | 1 | 93.1 | 5 | 0.9 | 1 | 0.56 | 23.2 |
| 10 | 0.94 | 17 | 7 | 41 | 96 | 2.5 | 0.5 | 1 | 95.6 | 2.5 | 0.9 | 1 | 0.56 | 63.2 |
| 11 | 0.94 | 17 | 7 | 41 | 86 | 12.5 | 0.5 | 1 | 85.6 | 12.5 | 0.9 | 1 | 0.56 | 85.3 |
| 12 | 0.94 | 17 | 7 | 41 | 93.3 | 5 | 0.7 | 1 | 93.3 | 5 | 0.7 | 1 | 1 | 90.3 |

*1 "Gr1" represents the first graphite powder.
*2 "Gr2" represents the second graphite powder.
*3 "CMC mass fraction ratio" represents a ratio of the mass fraction of the cellulose-based binder ($CMC_{(1)}$) in the first negative electrode composite material to the mass fraction of the cellulose-based binder ($CMC_{(2)}$) in the second negative electrode composite material.

(Results)

It can be seen from Table 1 in the above that if the following conditions were all satisfied, the capacity retention rate in the cycle test (i.e., "cycle capacity retention rate") was improved.

The first graphite powder has a circularity of 0.94 or more;

the D50 fraction is 29% to 54%;

in each of the first negative electrode composite material and the second negative electrode composite material, the second graphite powder has a mass fraction of 5% to 10%; and the ratio of the mass fraction of CMC in the first negative electrode composite material to the mass fraction of CMC in the second negative electrode composite material (i.e., "CMC mass fraction ratio" in Table 1) is 0.40 to 0.56.

(Additional Remarks)

The present specification also discloses a "method of producing a non-aqueous electrolyte secondary battery". The "method of producing a non-aqueous electrolyte secondary battery" includes the "method of producing a negative electrode plate" according to the present embodiment.

The present embodiment and the present example are illustrative in any respect. The present embodiment and the present example are non-restrictive. For example, it is originally intended that certain configurations of the present embodiment and the present example may be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A method of producing a negative electrode plate for a non-aqueous electrolyte secondary battery, the method comprising:

(A) applying a first negative electrode slurry to a surface of a negative electrode substrate to form a first layer;

(B) applying a second negative electrode slurry to a surface of the first layer to form a second layer; and (C) compressing the first layer and the second layer to produce the negative electrode plate, the first negative electrode slurry including a first negative electrode composite material, the second negative electrode slurry including a second negative electrode composite material, each of the first negative electrode composite material and the second negative electrode composite material including a negative electrode active material and a cellulose-based binder, the negative electrode active material consisting essentially of a first graphite powder and a second graphite powder, the first graphite powder having a circularity of 0.94 or more, and a fraction of a D50 of the second graphite powder to a D50 of the first graphite powder being 29% to 54%, in each of the first negative electrode composite material and the second negative electrode composite material, the first graphite powder having a mass fraction of 88.1% to 93.6%, and the second graphite powder having a mass fraction of 5% to 10%, the first negative electrode composite material including the cellulose-based binder at a first mass fraction, the second negative electrode composite material including the cellulose-based binder at a second mass fraction, and a ratio of the first mass fraction to the second mass fraction being 0.40 to 0.56.

2. The method of producing a negative electrode plate for a non-aqueous electrolyte secondary battery according to claim 1, wherein the first graphite powder has a D50 of 13 μm to 19 μm.

3. The method of producing a negative electrode plate for a non-aqueous electrolyte secondary battery according to claim 1, wherein
the negative electrode active material has a span value of 1.08 to 1.18,
the span value is calculated by the following expression (1):

$$(\text{span value}) = (D90 - D10)/D50 \tag{1}$$

in the expression (1),
D90 represents D90 of the negative electrode active material,
D10 represents D10 of the negative electrode active material, and
D50 represents D50 of the negative electrode active material.

4. The method of producing a negative electrode plate for a non-aqueous electrolyte secondary battery according to claim 1, wherein
the negative electrode active material has a tap density of 0.9 g/cm$^3$ to 1.2 g/cm$^3$.

* * * * *